Sept. 29, 1970　　　　M. CROSET　　　　3,531,378
PROCESS FOR OXIDIZING TELLURIUM
Filed May 31, 1967
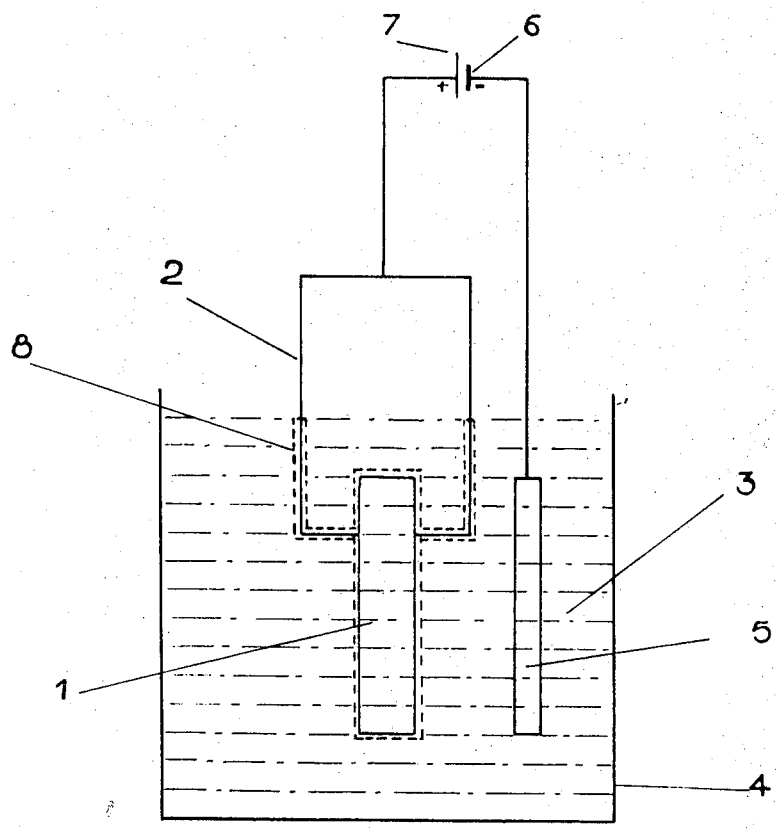

United States Patent Office 3,531,378
Patented Sept. 29, 1970

3,531,378
PROCESS FOR OXIDIZING TELLURIUM
Michel Croset, Paris, France, assignor to CSF-Compagnie Generale de Telegraphie Sans Fil, a corporation of France
Filed May 31, 1967, Ser. No. 642,489
Claims priority, application France, June 3, 1966, 64,146
Int. Cl. C23b 5/00
U.S. Cl. 204—14                                    2 Claims

ABSTRACT OF THE DISCLOSURE

A novel process for oxidizing the surface of a monocrystalline tellurium component, giving rise to the formation of a tellurium oxide film which can be used in the manufacture of semiconductor devices.

The component to be treated is immersed in an electrolyte bath in which tellurium oxide is insoluble or soluble only to a very small extent, said electrolyte bath being formed by a non-aqueous solvent saturated with tellurium oxide and containing water in precisely predetermined proportions to avoid porosity of the oxide layer.

---

The present invention relates to a novel process for oxidizing the surface of monocrystalline tellurium, giving rise to the formation of tellurium oxide film which can be used in the manufacture of semiconductor devices.

It is well known that films of this type can be employed for a variety of purposes.

For example, they can be used to passivate, i.e. protect, the surfaces of finished devices, or can be used as a control dielectric in field-effect tellurium devices.

Two methods of producing such a coating are known.

The first one is a heat treatment which consists in oxidizing the treated surface at high temperature.

The results obtained are generally good, but a high temperature treatment of this sort involves the risk of modifying the component in particular if, in the course of its manufacture, it has been submitted to other heat treatments.

The second method employs the electrolysis at ambient temperature.

The component is immersed in an aqueous electrolytic solution, where it serves as the anode. The oxygen necessary for the oxidation is derived from the water. However, since this oxygen is not dosed, it is always in excess and the deposit becomes porous, so that it does not properly perform its passivation or dielectric functions.

The method according to the invention is akin to this latter method, but makes it possible to obtain results which are comparable with those of the first method.

According to the invention, there is provided a process for oxidizing the surface of monocrystalline tellurium body comprising the step of immersing said body in an electrolyte bath in which tellurium oxide is soluble at most only to a small extent, said bath comprising a non-aqueous solvent saturated with tellurium oxide, adding water in predetermined proportion to said solvent, and causing an electrical current to flow in said bath, with said body as an anode.

For a better understanding of the invention and to show how the same may be carried into effect, reference will be made to the drawing accompanying the following description and the only figure of which illustrates a plate of tellurium immersed in an electrolyte bath in accordance with the invention.

A plate 1 of tellurium is held in position by a jaw arrangement 2 in an electrolyte 3 contained in a bath 4 in which tellurium oxide is insoluble or soluble to a small extent. The assembly of tellurium 1 and jaw arrangement 2 constitutes the anode, and a cathode 5 is connected to the negative terminal 6 of a direct current source, the anode 1–2 being connected to the positive terminal 7 of this same source.

In accordance with the invention, the metal of which the jaw arrangement 2 is made is so selected that, as the tellurium plate 1, it becomes covered with an oxide layer 8 in the electrolyte 3. In accordance with the invention, the said electrolyte 3 is a nonaqueous solvent, saturated with tellurium oxide and containing a precisely determined quantity of water. The oxide layer 8 deposited on the surface of the jaw arrangement insulates the latter from the bath 8 and oxidation can therefore progress normally without it being necessary first to insulate the said jaw arrangement.

In an example which is in no way limitative, the nonaqueous solvent used as the electrolyte solution can be pyridine.

A quantity of water, just sufficient for proper oxidation, is then accurately dosed, this quantity being in the order of 1%, by weight in accordance with the oxidation rate which can be tolerated and in order to obtain a deposit of good quality.

With the bath ready for use, a strip of metal, which will also oxidize in the solution used in accordance with the invention, is prepared. Tantalum has all the requisite qualities, and can furthermore easily be worked to form a jaw arrangement. The pressure contact Te=Ta, which requires no insulation, can thus be reduced to a negligible area, which can be as little as a few tenths of $mm^2$. only.

The arrangement of jaw system and tellurium is then immersed in the electrolytic solution hereinbefore defined and connected to the positive terminal of a direct current source. The cathode, connected to the negative terminal may be made, for example, of platinum.

Oxidation is carried out with a constant current below or equal to 1 $mA./cm.^2$ of oxidizable surface, until the preset voltage corresponding to the desired oxide thickness is reached.

The tellurium plate is thus oxidized over the whole of its surface with the exception of the small areas where it has been in contact with the jaw arrangement. The oxide obtained has all the requisite qualities for use as an active dielectric in Te field-effect devices, or as as passivating element on finished surfaces.

Of course, the invention is not limited to the embodiment described which has been given solely by way of example.

What is claimed is:
1. A process for oxidizing the surface of monocrystalline tellurium body, comprising the step of immersing said body in a bath, in which tellurium oxide is soluble at most only to a small extent, said bath consisting essentially of a non-aqueous solvent saturated with tellurium oxide, adding to said bath a small amount of water and causing an electrical current to flow in said bath said body as an anode to provide limited oxidation of said surface.
2. A process according to claim 1, wherein said nonaqueous solvent is pyridine and said small amount of water is about 1% of the bath by weight.

References Cited
UNITED STATES PATENTS
3,312,603    4/1967    Wales _____ 204—14

HOWARD S. WILLIAMS, Primary Examiner
T. TUFARIELLO, Assistant Examiner